Nov. 8, 1938.   H. W. LANDENBERGER   2,135,721
APPARATUS FOR PRESSURE TESTING
Filed June 5, 1935   3 Sheets-Sheet 1
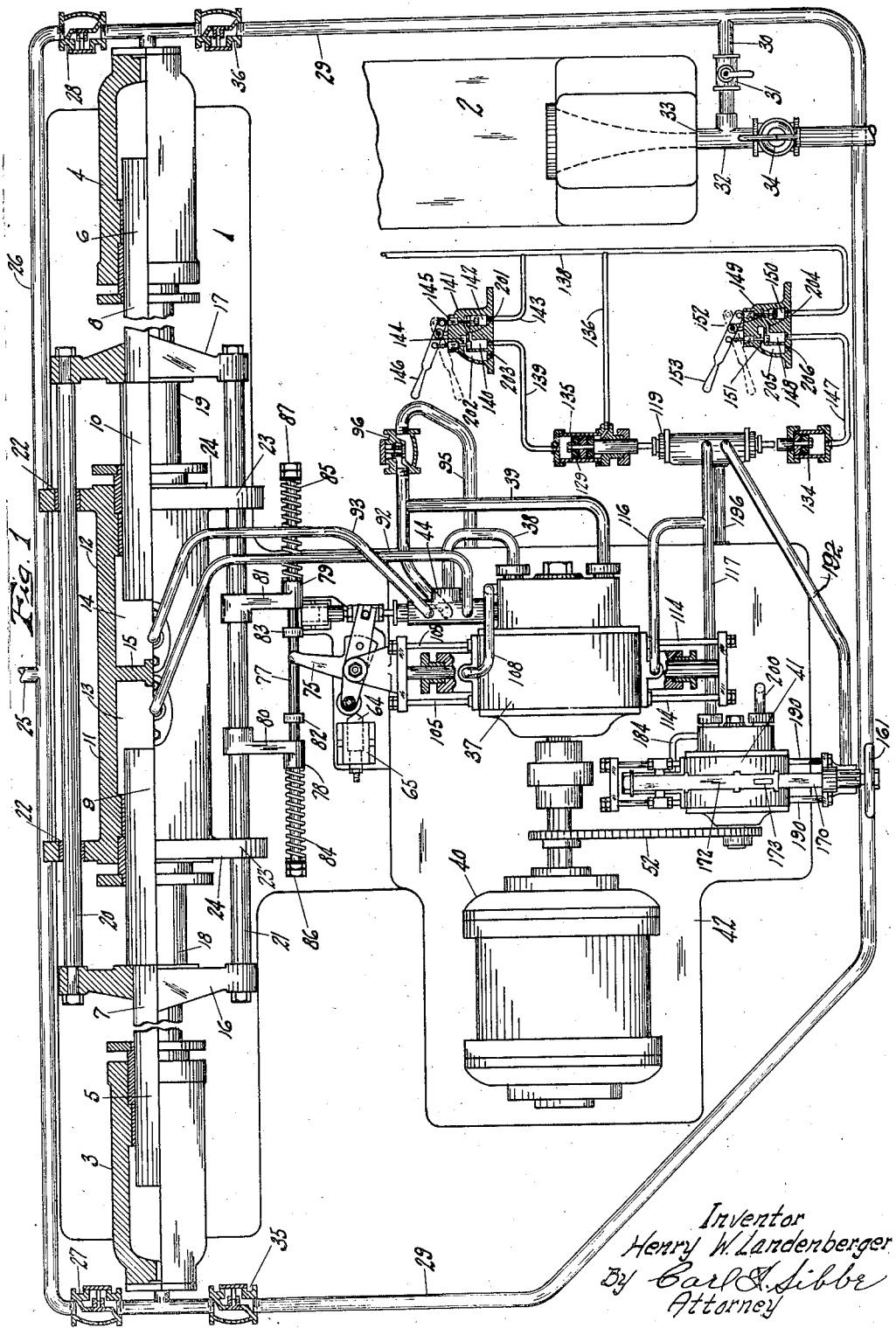
Inventor
Henry W. Landenberger
By Carl A. Sibbr
Attorney Nov. 8, 1938.   H. W. LANDENBERGER   2,135,721
APPARATUS FOR PRESSURE TESTING
Filed June 5, 1935   3 Sheets-Sheet 2
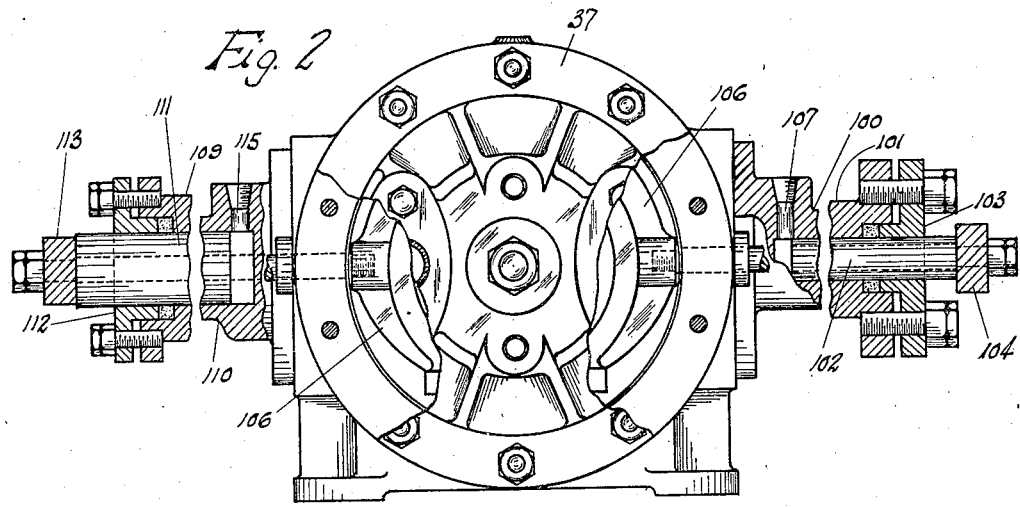
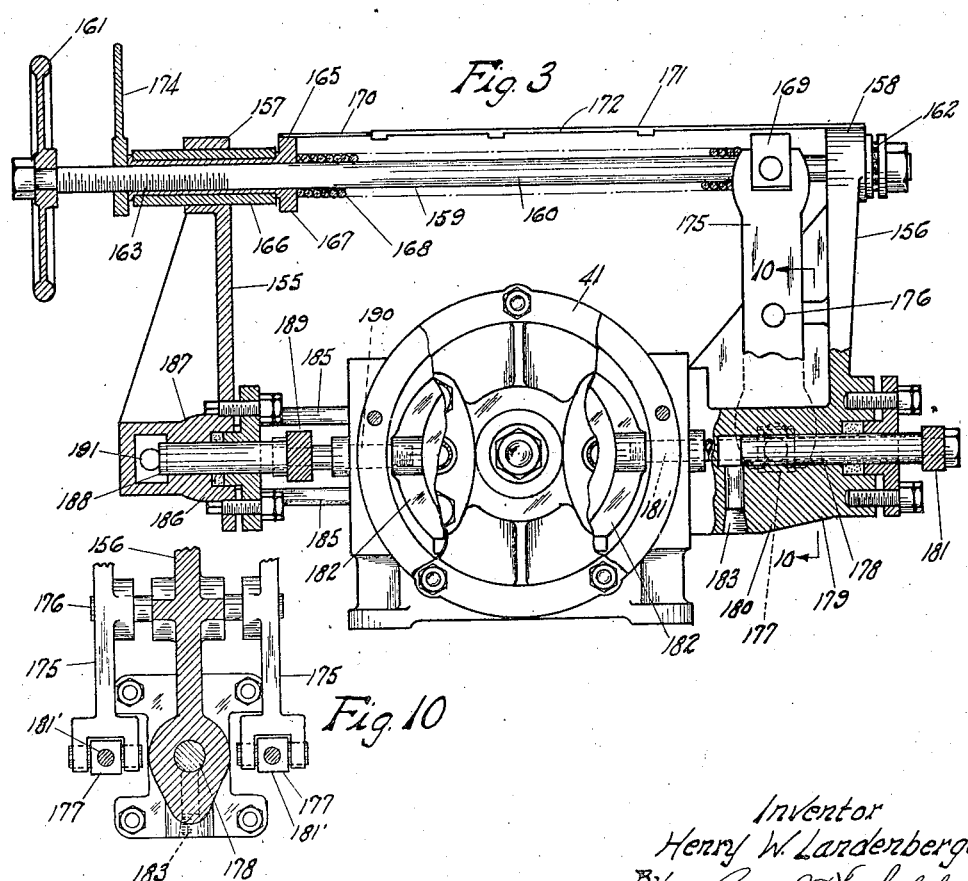
Inventor
Henry W. Landenberger
By Carl F. Libbe
Attorney Nov. 8, 1938. H. W. LANDENBERGER 2,135,721
APPARATUS FOR PRESSURE TESTING
Filed June 5, 1935 3 Sheets-Sheet 3
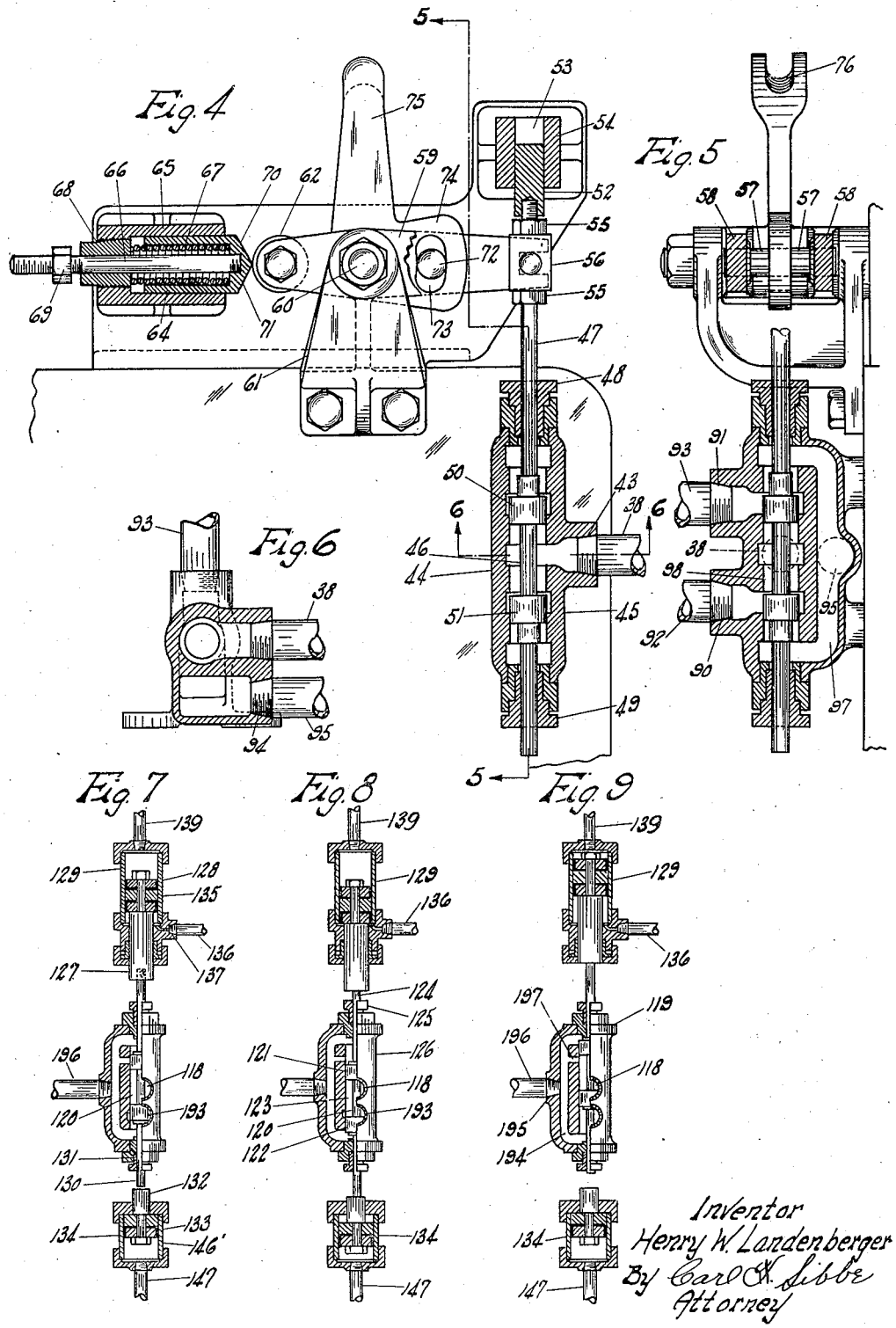

Patented Nov. 8, 1938

2,135,721

UNITED STATES PATENT OFFICE 2,135,721

APPARATUS FOR PRESSURE TESTING

Henry W. Landenberger, Philadelphia, Pa., assignor to American Engineering Company, Philadelphia, Pa., a corporation of Pennsylvania Application June 5, 1935, Serial No. 25,029

26 Claims. (Cl. 103—45)

This invention relates to apparatus for pressure testing, and more particularly to pressure testing apparatus of the hydraulic type.

One object of the present invention is to provide a generally improved and simplified apparatus for testing tubes, boiler drums, couplings, and the like, by applying thereto fluid pressures of variable predetermined intensities.

Another object is to provide a pressure testing apparatus which is adapted to impress fluid pressures of certain predetermined intensities upon the object under test and to maintain said pressures thereon for any desired period of time, said apparatus having means associated therewith for changing the first mentioned pressure to another predetermined pressure, and to also maintain this latter pressure upon the object for any desired period of time.

A further object is to provide a pump for applying fluid pressure to the object to be tested at a steady predetermined pressure, a second pump for actuating said first mentioned pump, and a novel control system for controlling the operation of said pumps and which enables various predetermined pressures to be impressed upon the object under test.

A still further object is to provide a novel control mechanism for pumps of the variable stroke type which functions to control the stroke adjusting mechanisms thereof to condition the same for operation under a wide range of pressures.

Other and further objects will become apparent as the description of the invention progresses.

Of the drawings:

Fig. 1 is a diagrammatic plan view of the apparatus comprising the present invention, showing some of the elements thereof in section.

Fig. 2 is a side view of one of the pumps associated with the apparatus showing some of the control elements therefor in section.

Fig. 3 is a side view of the pump and associated control mechanism which functions to control the operation of the pump shown in Fig. 2, some of the elements of the control mechanism being shown in section.

Fig. 4 is a plan view of the reversing valve and operating mechanism therefor for controlling the operation of the test fluid pump.

Fig. 5 is a view taken substantially along line 5—5 of Fig. 4.

Fig. 6 is a view taken substantially along line 6—6 of Fig. 4.

Fig. 7 is a plan view partly in section of the power operated valve for controlling the operation of the high pressure pump, showing the parts thereof in one position of adjustment.

Fig. 8 is a view similar to Fig. 7 showing the parts in a second position of adjustment.

Fig. 9 is a similar view of the control valve and associated parts showing the parts in a third position of adjustment, and Fig. 10 is a sectional end view taken substantially along line 10—10 of Fig. 3.

Referring to the drawings, the numeral 1 designates generally a double acting pump which impresses a test fluid, such as water, under pressure to a test bench 2 upon which is suitably supported the object (not shown) to be tested.

Pump 1 comprises a pair of aligned cylinders 3 and 4 in which operate the outer reduced ends 5 and 6 of rams 7 and 8 respectively. The inner enlarged ends 9 and 10, respectively, of said rams operate in a second pair of cylinders 11 and 12, the inner ends of the chambers 13 and 14 of which being separated in this instance by a partition 15. Mounted upon the reduced portions 5 and 6 of rams 7 and 8 are a pair of crossheads 16 and 17, the inner sides of which abut the annular shoulders 18 and 19 respectively, formed by the said reduced portions of the rams. These crossheads are rigidly connected by a pair of tie rods 20 and 21 which operate in bearings 22 and 23 respectively, provided in the laterally extending flanges 24 of cylinders 11 and 12. Test fluid, such as water, is supplied to the system from a source of supply (not shown) through a pipe 25. Pipe 25 communicates with a branch pipe 26, the opposite ends of which communicate with the left and right hand ends respectively, of cylinders 3 and 4. Check valves 27 and 28 are provided in branch pipe 26 which enable fluid to be drawn into cylinders 3 and 4 when the rams 7 and 8 move to the right and left respectively, but which prevent fluid from flowing back to pipe 25 from said cylinders. Rams 7 and 8, by virtue of crossheads 16 and 17, and tie rods 20 and 21 operate in unison, so that when ram 8 is moving to the right, thereby supplying fluid pressure to the test bench 2, ram 7 is operating to draw a new supply of test fluid into the system, and vice versa when ram 7 operates to supply fluid pressure to the test bench ram 8 is drawing a new supply of test fluid into the cylinder 4. Cylinders 3 and 4 are connected to the test bench 2 by a pipe 29, a short pipe 30 having a control valve of any suitable type 31 provided therein, and a pipe 32. One end of pipe 32 is connected to the nozzle stock 33 of the test bench, while the other end thereof is connected to exhaust.

A control valve 34 is provided in pipe 32 which permits the fluid to flow either to the test bench 2 or to exhaust. A second pair of check valves 35 and 36 is provided in pipe 29 which operate to prevent the test fluid from flowing back into cylinders 3 and 4.

Rams 7 and 8 are operated by a high pressure variable stroke pump 37 which may be of the general type shown and described in the United States patent to Hele-Shaw, Number 1,077,979, or of any other suitable type. Pump 37 may be driven by any suitable driving mechanism, such as an electric motor 40, and in this instance is adjusted to deliver fluid pressure to a pipe 38 and suction to a pipe 39. A pump 41, which, as will appear fully hereinafter, for controlling the operation of high pressure pump 37, and which may also be of the general type shown in the said patent to Hele-Shaw, is also driven by motor 40 through a chain and sprocket mechanism shown at 52. Pumps 37 and 41, and motor 40 are supported upon a bed plate 42 on which is mounted in a well known manner a tank for supplying make-up fluid to said pumps.

Pressure pipe 38 leading from pump 37 is connected to the central port 43 of a reversing valve 44. This valve comprises a casing 45 in which operates a valve member 46, consisting of a valve stem 47 extending through suitable stuffing boxes 48 and 49 provided in the opposite ends of casing 45, and a pair of spaced valve heads 50 and 51. The upper end of valve stem 47 has secured thereto a sliding block 52 which operates in a slot 53 provided in a guide bracket 54. Valve stem 47 has also secured thereto by any suitable means, such as a pair of nuts 55, a block 56 having a pair of laterally extending pins 57 secured thereto. These pins receive the bifurcated ends 58 of a pair of levers 59 pivoted intermediate their ends, as shown at 60, on a bracket 61 secured in any suitable manner to the bed plate 42. The other ends of levers 59 support a roller 62 which, as shown in Figs. 1 and 4, engages the right hand end of a plunger 64. Plunger 64 is mounted for reciprocation in a guide bracket 65 and is provided with a central bore for receiving a guide rod 66 and a coil spring 67. As shown in Fig. 4, guide rod 66 is secured to the right hand end of plunger 64 and is slidably mounted in the central bore of a plug 68, adjustably secured to the left hand end of guide bracket 65. Spring 67 extends between plug 68 and the inner end of the bore of plunger 64, as shown in Fig. 4, and tends to urge the latter to the right. The limit of travel of plunger 64 is adjusted by an adjustable stop nut 69. Plunger 64 has provided at the right hand end thereof a pair of cam faces 70 and 71 which are adapted for engagement with roller 62, to rock levers 59 about their pivot, as will appear more fully hereinafter. Levers 59 also have secured thereto between pivot 60 and the bifurcated ends thereof, a pin 72 which extends through an arcuate slot 73 provided in the substantially horizontal arm 74 of a bell-crank lever 75. The free end of the substantially vertical arm of bell-crank lever 75 is bifurcated, as shown at 76, and receives a rod 77 slidably mounted in bearings 78 and 79 provided in arms 80 and 81, respectively, secured at spaced points to tie rod 21. Rod 77 has provided thereon intermediate bearings 78 and 79 a pair of splaced lugs 82 and 83, and has provided at the left and right hand ends respectively thereof a pair of coil springs 84 and 85. These springs extend respectively between bearings 78 and 79, and a pair of adjustable nuts 86 and 87 secured to the threaded outer ends of rod 77. The pin and slot connection 72, 73 between levers 59 and 75 provide a lost motion connection which enables the stops 82 and 83 to operate lever 75 a predetermined distance before valve 46 is shifted, as will appear more fully hereinafter.

Cylinders 11 and 12 of pump 1 are connected to ports 90 and 91 of valve 44 by a pair of pipes 92 and 93 respectively. A fourth port 94 of valve 44 has connected thereto one end of a pipe 95, the other end of which is connected to the makeup tank, as shown in Fig. 1, and a check valve 96 provided in pipe 95 prevents fluid from the system from passing to the makeup tank while permitting makeup fluid to be drawn into the system.

Referring more particularly to Fig. 5, it will be seen that port 94 of valve 44 communicates with a longitudinally extending passage 97, of said valve, which in turn communicates with opposite ends of the chamber 98 in which valve 46 operates. Suction pipe 39 is connected to pipe 95 at a point on the latter between port 94 and check valve 96. Fig. 4 shows the parts arranged in central position wherein the fluid from pressure pipe 38 is trapped in chamber 98 between valve heads 50 and 51, and consequently no fluid passes to cylinder 11 or 12. When the parts are in the position shown in Fig. 1, however, it will be seen that fluid entering central chamber 98 from pipe 38 will flow directly into pipe 92 and thence to chamber 13 of cylinder 11, causing rams 7 and 8 to move to the left (Fig. 1). The fluid in chamber 14 of cylinder 12 will now flow through pipe 93, passage 97, pipe 95, and thence back to pump 37 through suction pipe 39. On the other hand, when the parts are operated in the reverse direction from that shown in Fig. 1, fluid entering chamber 98 from pipe 38 will flow to cylinder 12 from pipe 93 causing the rams 7 and 8 to move to the right. The fluid in chamber 13 of cylinder 11 will now flow through pipe 92, passage 97, pipe 95, and back to pump 37 through pipe 39.

The lost motion connection 72—73 between levers 59 and 75 permits the pump 1 to overtravel slightly in either direction before reversal of valve 44 occurs. This action prevents valve 44 from assuming, at any time, a neutral position, thereby cutting off the flow of fluid between pumps 37 and 1. The plunger 64, acting on lever 75, is of the load and fire type and operates to instantaneously shift the valve to its upper or lower positions of adjustment when the roller 62 clears the line of intersection of cam faces 70 and 71.

The means for controlling the intensity of the test fluid will now be described in detail. Referring more particularly to Figs. 1 and 2, it will be seen that pump 37 has secured thereto, by any suitable means, a fluid motor 100, comprising a cylinder 101 in which operates a piston 102. Piston 102 extends through a gland 103 provided at the right hand end (Fig. 2) of cylinder 101, and abuts against a crosshead 104. Crosshead 104 has secured to the opposite ends thereof, by any suitable means, one end of a pair of guide rods 105, the other ends of which being secured to the sliding blocks 106 of pump 37 in a well known manner. A port 107 provided in the left hand end of cylinder 101 has attached thereto one end of a pipe 108, the other end of which is connected to the pressure side of pump 37 in a well known manner. It therefore is seen that the pressure developed by pump 37 is always in communication with motor 100. The operation of motor 100 is resisted by a second motor 109 secured to the opposite end of pump 37. Motor 109 also comprises a cylinder 110 having a piston 111 operating therein. The left hand end (Fig. 2) of piston 111 extends through a gland 112 provided at that end of cylinder 110. Piston 111 abuts against a crosshead 113 to the opposite ends of the latter of which are secured, as shown in Fig. 1, a pair of guide rods 114. The inner ends of guide rods 114 are also secured to sliding blocks 106 of pump 37. It will be noted upon reference to Fig. 2 that piston 111 of motor 109 is of greater cross sectional area than piston 102 of motor 100, and therefore, when the former is subjected to a comparatively low pressure, as will appear hereinafter, it will resist the operation of motor 100, even though subjected to a higher pressure. Cylinder 110 of motor 109 is provided with a port 115 to which is connected one end of a pipe 116, the other end of said pipe being connected to a pipe 117 intermediate the ends of the latter. Pipe 117 is connected at one end to the pressure side of control pump 41, and at the other end to a port 118 of a pressure operated control valve 119. Control valve 119 comprises a valve member 120 having secured thereto a pair of valve heads 121 and 122 operating in the substantially cylindrical central chamber 123 of the casing 126 of said valve. Valve 120 has secured to the upper end thereof a valve stem 124 which passes through a gland 125 provided at the upper end of casing 126. Valve stem 124 is secured at the upper end thereof to a rod 127 secured to the piston 128 of a fluid motor 129. The lower end of valve member 120 has also secured thereto a guide stem 130 which extends through a gland 131 provided at the lower end of the valve casing 126. The lower end of guide stem 130 abuts against the upper end of a rod 132 secured to a piston 133 of a second fluid motor 134. The lower end of the cylinder 135 of fluid motor 129 is at all times connected to a source of fluid pressure supply, such as air, or any other suitable fluid by means of a pipe 136 extending between the lower port 137 of cylinder 135 and a main supply pipe 138. The upper end of cylinder 135 is connected by means of a pipe 139 to the left hand chamber 140 of a control valve 141. The right hand chamber 142 of valve 141 is connected by means of a pipe 143 to the supply pipe 138. A pair of valves 144 and 145 operated by a lever 146 control the flow of fluid from supply pipe 138 to the upper end of cylinder 135. The lower end of cylinder 146' of fluid motor 134 is connected by means of a pipe 147 to the left hand chamber 148 of a second control valve 149. The right hand chamber 150 of valve 149 is connected to the supply pipe 138. A pair of valves 151 and 152 operated by hand lever 153 control the flow of fluid from supply pipe 138 to the lower end of cylinder 146.

Referring to Figs. 1 and 3, the control pump 41 has secured to the opposite sides thereof a pair of vertically extending brackets 155 and 156. Mounted in suitable bearings 157 and 158 provided in the upper ends of brackets 155 and 156 respectively, is a control mechanism 159 by which the intensity of the test fluid may be varied. This mechanism comprises a rotary shaft 160 extending between brackets 155 and 156 and operated by a hand wheel 161. The right hand end of shaft 160 operates in a thrust bearing 162. The left hand end 163 of shaft 160 is provided with screw threads 163 which engage the internal threads of an extended collar 165 operating in a bushing 166. Collar 165 has provided at the right hand end thereof an annular flange 167 against which one end of a coil spring 168 abuts. The other end of said coil spring abuts a crossbar 169 slidably mounted on shaft 160. Secured to the upper end of flange 167 is one element 170 of a pressure indicator 171. The other element of indicator 171 comprises a guide plate 172 having a substantially rectangular slot 173 provided therein. Element 170 contains designations indicating the pressure of spring 168 when placed under compression by the operation of hand wheel 161. To adjust the device so as to produce a predetermined pressure, hand wheel 161 is simply rotated thereby compressing spring 168 until the desired predetermined pressure is obtained; the operator observing this indication by means of the indicator just described. Shaft 160 is then locked in position by means of the locking lever 174.

Crossbar 169 receives the upper bifurcated ends of a pair of levers 175 pivoted intermediate their ends at 176 to bracket 156. The lower ends of levers 175 are also bifurcated and receive the laterally extending studs provided on a pair of blocks 177 as shown in Fig. 10. Blocks 177 are respectively secured at one end to a pair of guide rods 181' secured at one end to a crosshead 181 and at the other end to the sliding block 182 of pump 41. A fluid motor 180 is secured to the right hand end (Fig. 3) of pump 41 and the outer end of the piston 178 operating in the cylinder 179 thereof abuts the crosshead 181. Cylinder 179 is provided with a port 183 to which one end of a pipe 184 is connected, the other end of said pipe being connected in any suitable manner to the pressure side of pump 41. Thus the pressure exerted by spring 168 tending to maintain the pump 41 on stroke is opposed by motor 180, and when this pressure exceeds the compression of spring 168 the pump will be actuated to neutral stroke position by said motor. Attached to bracket 155 and to the casing of pump 41 by rods 185 is a second fluid motor 186. This motor also comprises a cylinder 187 having a piston 188 operating therein. The right hand end of piston 188 abuts a crosshead 189 to the opposite ends of which is secured in any suitable manner a pair of guide rods 190. The inner ends of these rods operate in suitable bearings provided in the casing of pump 41 and are also secured to the sliding blocks 182 of said pump. The left hand end of cylinder 187 is provided with a port 191 to which one end of a pipe 192 is connected. The other end of pipe 192 is connected to a port 193 provided in control valve 119, as shown in Figs. 1, 7, 8 and 9. Valve 119 has also provided in the casing 126 thereof a passage 194 which communicates with the opposite ends of the chamber 123 in which valve 120 operates and with a small connecting passage 197 extending into passage 194 from said passage 123. Casing 126 is further provided with a third port 195 which communicates with passage 194, and to which is secured one end of a pipe 196, the other end of which being connected to the supply or makeup tank 42.

From the foregoing description it is seen that when valve 120 is in the position shown in Fig. 7 the fluid under pressure from pump 41 entering said valve through pipe 117 is trapped between valve heads 121 and 122. Under these conditions the only force tending to return pump 41 to neutral position against the action of spring 168 is that exerted by piston 178 of motor 180. However, when valve 120 is adjusted to the position shown in Fig. 8 fluid from pipe 117 will enter chamber 123 and then flow to the left hand end of motor 186 through pipe 192 with the result that piston 188 of motor 186 will assist piston 178 of motor 180 in returning the sliding block 182 of pump 41 to neutral position. If pistons 178 and 188 are of the same diameter, pump 41 will be placed on neutral or leakage stroke when a pressure equal to one-half the original pressure is developed by said pump. Therefore, inasmuch as the motor 109 associated with pump 37 is connected to the pressure developed by pump 41 through pipes 116 and 117, the effort tending to maintain pump 37 on stroke is also reduced by one-half. This results in applying just one-half the pressure to cylinders 7 and 8 of pump 1, and consequently the pressure impressed on bench 2 is equal to one-half of that impressed upon it before adjustment of valve 120 as just described. It is to be noted in either of the above cases that when the pressure developed by pump 37 is sufficient to cause motor 100 to actuate the sliding blocks 106 toward neutral position, the piston 111 of motor 109 is carried therewith, causing it to increase the pressure in cylinder 110, and consequently in the system connected therewith. When valve 119 is in the position shown in Fig. 7, this increase in pressure is transmitted to piston 178 of motor 180, causing the latter to actuate the sliding blocks 182 of pump 41 beyond neutral in the opposite direction from which they were adjusted by spring 168. When valve 119 is adjusted to the position shown in Fig. 8, this increase in pressure is transmitted to piston 188 of motor 186, as well as piston 178 of motor 180, and the combined action thereof effects operation of the sliding blocks 182 beyond neutral as above described. By this action the fluid contained in cylinder 110 will flow through pipes 116 and 117, and thence through pump 41 and then is discharged into the makeup tank through pipe 200. When motor 100 has thus operated sliding blocks 106 to leakage stroke position, and pump 41 has discharged from the system a quantity of fluid equal to that contained in cylinder 110, then spring 168 will actuate sliding blocks 182 in the opposite direction past neutral to leakage stroke position, and the system will then assume a balanced condition, with the result that a constant pressure is maintained upon the object under test. When valve 120 is adjusted to the position shown in Fig. 9, fluid entering the chamber 123 through pipe 117 will pass through passage 197 and thence to exhaust through passage 194 and pipe 196. When this occurs no pressure will be impressed upon the pistons operating in motor 109 of pump 37 or motors 186 and 150 associated with pump 41, and as a result pump 37 will be actuated to neutral stroke by motor 100, and pump 41 will simply discharge its fluid to exhaust. As shown in Fig. 1, the suction pipe 200 of pump 41 is connected directly to the makeup tank 42. Control valve 141 is provided with a passage 201 which, when lever 146 is in its upper position, establishes communication between chambers 140 and 142. Valve 141 has also provided at the left hand side thereof a chamber 202 which is adapted to communicate with chamber 140 when lever 146 has been moved to its lower position of adjustment. When in this position valve 145 closes its port and prevents the flow of fluid from pipe 138 to the upper end of motor 135. However, since valve 144 has uncovered its port the fluid trapped in the upper end of motor 135 will now pass from chamber 140 into chamber 202 and thence to atmosphere through a port 203 provided at the bottom of said chamber. Valve 149 is also provided with a chamber 204 which establishes communication between chambers 148 and 150 when lever 153 is in its uppermost position. Valve 149 has also provided at the left hand side thereof a third chamber 205 adapted when lever 153 is in its lowermost position of adjustment to be in communication with chamber 148 and an opening 206 provided at the bottom of said chamber connects the same to atmosphere.

From the foregoing description, the operation of my improved apparatus is thought to be apparent. However, in order to correlate the various elements thereof a brief resume of the operation of the apparatus as a whole will now be given. Let us assume, for example, that the apparatus is to be used for testing steel tubes. Hand wheel 161 is first adjusted until the indicating device 171 indicates the proper high test pressure to which the tubes are to be tested. A tube is then suitably secured to the test bench 2, one end of which being fastened to the nozzle stock 33. Water is then introduced to the tube to first drive out any air that may be trapped therein; this water may be introduced through pipe 32 or by means of an auxiliary circuit provided for that purpose. Valve 34 is then closed so as to prevent a back flow of the water through pipe 32. During these preliminary operations valve 31 is closed after which said valve is opened and levers 146 and 153 of control valves 141 and 149 respectively, are moved to their uppermost positions of adjustment. Fluid pressure from the auxiliary circuit 138 will now enter motor 129 at both the upper and lower ends of the cylinder thereof and owing to the fact that the effective area of the upper end of piston 128 is greater than that of its lower end it will move to its lower position of adjustment, as shown in Fig. 7. Fluid pressure passing through valve 149 will actuate piston 133 of motor 134 upwardly, and as a result valve member 120 will assume the position shown in Fig. 7. In this position valve heads 121 and 122 are so disposed as to trap the fluid entering chamber 120 through port 118, and as a result no fluid will be communicated to motor 186. Motor 180, however, it will be remembered, is at all times connected to the pressure side of the pump 41 through pipe 184. Consequently piston 178 operating in said motor will tend to place pump 41 on neutral stroke against the action of spring 168. Therefore, when the pressure developed by pump 41 exceeds the compression of spring 168 it will be returned to neutral or leakage stroke position by the action of motor 180. Motor 109, provided at the left hand end of high pressure pump 37, is connected to the pressure developed by pump 41 through a pipe connection 116. The piston 111 of motor 109 will accordingly place high pressure pump 37 on stroke, and as a result fluid under pressure will be delivered therefrom through pipe 38. When valve 44 is in the position shown in Fig. 1, fluid from pump 37 will flow through the central chamber of said valve and thence through pipe 92 to chamber 13 of cylinder 11. Chamber 14 of cylinder 12 on the other hand, will be connected to exhaust through pipe 93, port 91, passage 97, pipe 95, and suction pipe 39. The rams 7 and 8 of pump 1 will then move to the left (Fig. 1) causing the water previously drawn into cylinder 3 to be delivered under pressure to nozzle stock 33 through pipes 29, 30 and valve 31. As rams 7 and 8 approach the limit of travel in this direction, dog 83 actuated by arm 81, carried by tie rod 21, will rock bell-crank lever 75 in a counter clockwise direction, thereby shifting valve 44 so as to cause fluid pressure from pump 37 to pass to the chamber 14 of cylinder 12, and at the same time, connecting chamber 13 of cylinder 11 to exhaust. Rams 7 and 8 now move to the right and test fluid in cylinder 4 is delivered under pressure to nozzle stock 33 while a new supply of test fluid will be drawn into cylinder 3 by the suction action of ram 7 as it moves to the right. In this manner fluid pressure of a constant intensity will be impressed upon the object under test. When this pressure exceeds the tension of spring 168, the pump 41 will be returned to leakage stroke and as a result the desired pressure is thereby maintained in the system. In the event this pressure should drop off, the pump is immediately placed on stroke and a higher pressure immediately is built up in the system.

When the tube has been subjected to this high predetermined pressure for the desired period of time, lever 153 of control valve 149 is moved downwardly. Valve 152 now closes its port and prevents fluid from pipe 138 from entering motor 134. Valve 151, on the other hand, uncovers its port and as a result fluid from motor 134 now flows to atmosphere through pipe 147, chambers 148 and 205, and port 206, causing valve 119 to assume the position shown in Fig. 8. When in this position, fluid under pressure from pump 41 entering port 118 will pass to pipe 192 through central passage 123 and port 193, and thereby operate piston 188 of motor 186 toward the right. At this time pistons 178 and 188 are both operating against the action of spring 168, and consequently if these pistons have the same cross-sectional area the pressure tending to maintain the pump 41 on neutral stroke is reduced by one-half. Since motor 109 associated with pump 37 is also in communication with the pressure side of pump 41, the pressure acting on piston 111 thereof will also be reduced and as a result the pressure of the fluid delivered to pump 1 by pump 37 is equal to one-half the original pressure. Rams 7 and 8 of pump 1 are thus operated by a pressure reduced by one-half and consequently the test fluid impressed upon the tube under test is one-half the intensity of that originally impressed thereon.

When the tube has been subjected to this pressure for the desired period of time, the operator moves lever 153 of valve 149 to its uppermost position and lever 146 of valve 141 to its lower position. The upper end of motor 129 is now connected to exhaust and the pressure acting at the lower end of piston 128 moves the same upwardly, as shown in Fig. 9. Motor 134 by this adjustment of valve 148 is again connected to the pressure line 138 and its piston 133 consequently is moved upwardly, and as a result valve 119 assumes the position shown in Fig. 9. When in this position the fluid pressure from pump 41 entering valve 119 through pipe 117 and port 118 passes through central chamber 123, passage 197 to longitudinal passage 194, and thence to exhaust through pipe 196. The fluid from pump 41 thus simply bypasses at no pressure to makeup tank 42 through valve 119 in the manner just described. Pump 37 will now be operated to neutral position by motor 100 inasmuch as no pressure is communicated to motor 109 through pipe 116. The apparatus is now conditioned for a new cycle of operation and the tube that has just been tested is removed and a new one suitably secured to the test bench, and the operation of the apparatus as above described is repeated.

While the embodiment herein shown is admirably adapted to fulfill the objects primarily stated, it is to be understood that the invention is not to be limited in this embodiment since it may be embodied in other forms, all coming within the scope of the claims which follow.

What is claimed is:

1. In a fluid system, the combination with a pump for supplying a test fluid under pressure, of a motor for operating said pump, means including a second pump for actuating said motor, and means including a third pump for controlling the pressure conditions of said second pump.

2. In a device of the class described, the combination with a pump, of a motor for operating said pump, means including a second pump for actuating said motor, means including a third pump for controlling the pressures developed by said second pump, and means for controlling the operation of said third pump.

3. A fluid system, comprising in combination, a reciprocatory pump, a motor for operating said pump, means including a second pump for actuating said motor, a valve disposed between said motor and second pump for controlling the flow of fluid to said motor, means operated by said motor for shifting said valve, to effect a reverse operation of the latter, and means including a third pump for controlling the pressures developed by said second pump.

4. A fluid system, comprising in combination a reciprocatory pump, a motor for operating said pump, means including a second pump for actuating said motor, means including a third pump for controlling the pressures in said second pump, adjustable means for said third pump for varying the pressures therein, and additional means for changing at will the pressures in said second and third pumps.

5. In a fluid system, the combination with a double acting reciprocatory pump, of a motor for operating said pump, means including a second pump for actuating said motor, a valve for controlling the operation of said motor, means operated by said motor for moving said valve toward a central position, said means including a lever mechanism having a lost motion connection, and resilient means for completing the movement of said valve to effect a reverse operation of said motor and consequently of said first mentioned pump.

6. In a fluid system, the combination with a reciprocatory pump, of a motor for operating said pump, means including a variable stroke pump for actuating said motor, fluid pressure means for placing said variable stroke pump on discharge stroke, means operated by the pressure delivered by said last mentioned pump tending to actuate the latter to neutral stroke in opposition to said fluid pressure means, a third pump, adjustable resilient means for placing said third pump on discharge stroke, means connecting said fluid pressure means to the pressure side of said third pump, a servomotor connected to the pressure side of said third pump tending to actuate the latter to neutral position, a second normally ineffective servomotor operatively connected to said third pump and adapted to operate in unison with said first mentioned servomotor, and means for rendering said second servomotor effective.

7. In a fluid system, the combination with a pump, of adjustable resilient means for placing said pump on discharge stroke, a fluid motor connected to the discharge side of said pump tending to place the latter on neutral stroke against the action of said resilient means, a second normally ineffective fluid motor connected to said pump and adapted, when conditioned for operation in unison with said first mentioned fluid motor, a valve operatively connected to the discharge side of said pump, said valve having a plurality of ports therein, said valve when actuated to one position of adjustment traps the fluid discharging from said pump, when moved to a second position of adjustment said valve permits the fluid discharging from said pump to flow to said second fluid motor whereby the latter operates in unison with said first mentioned fluid motor, and when actuated to a third position of adjustment said valve connects the discharge of said pump to exhaust whereby the fluid discharging from said pump bypasses to exhaust at no pressure, and means for actuating said valve to its different positions of adjustment.

8. In a device of the class described, the combination with a pump, of adjustable resilient means for placing said pump on discharge stroke, a normally ineffective fluid motor connected to said pump and adapted when conditioned for operation to operate in opposition to said resilient means, a valve operatively connected to the discharge side of said pump and through which the fluid discharging from said pump is adapted to pass, said valve being adjustable to a plurality of positions of adjustment, said valve when in one position of adjustment traps the fluid discharging from said pump, when moved to a second position of adjustment said valve permits the fluid discharging from said pump to flow to said fluid motor thereby conditioning the latter for operation, and when moved to a third position of adjustment said valve connects the pump to exhaust whereby the fluid discharging from said pump bypasses to exhaust at substantially atmospheric pressure, fluid pressure means for actuating said valve to its different positions of adjustment, and a pair of manually operable valves for controlling the operation of said fluid pressure means.

9. In a device of the class described, the combination with a pump, of a pressure pipe and a suction pipe leading from said pump, a valve operatively connected to said pressure pipe, fluid pressure means for adjusting said valve to different positions of adjustment to control the operation of said pump, and manually operable means for controlling the operation of said fluid pressure means.

10. In a device of the class described, the combination with a pump, of a pressure pipe and a suction pipe leading from said pump, a valve operatively connected to said pressure pipe, fluid pressure means for adjusting said valve to different positions of adjustment to control the operation of said pump, a source of fluid pressure communicating with said fluid pressure means, and one or more manually operable valves for controlling the flow of fluid from said source of supply to said fluid pressure means.

11. A fluid system comprising in combination, a pump for supplying fluid under pressure, a motor for operating said pump, means including a second pump for actuating said motor, a valve disposed between said motor and second pump for controlling the flow of fluid to said motor, means operated by said motor for moving said valve a predetermined distance in either direction, and a snap mechanism for completing the movement of said valve to effect a reverse operation of the pump first named.

12. A fluid system comprising in combination, a pump for supplying fluid under pressure, a motor for operating said pump, means including a second pump for actuating said motor, a valve disposed between said motor and second pump for controlling the flow of fluid to said pump for controlling the flow of fluid to said motor, means operated by said motor for moving said valve a predetermined distance in either direction, a snap mechanism for completing the movement of said valve to effect a reverse operation of the pump first named, and means including a third pump for controlling the pressure of the fluid in said second pump.

13. A fluid system comprising in combination, a double acting reciprocatory pump, a motor for operating said pump, means including a rotary pump for actuating said motor, a valve disposed between said motor and second pump for controlling the operation of said motor, operating mechanism for said valve including a pair of levers, a roller mounted at the free end of one of said levers, a snap mechanism adapted to engage said roller to rock said levers in either direction, and means operated by said motor for engaging an arm of the other of said levers to actuate the same a predetermined distance and at the same time load said snap mechanism, the latter of which then completes the rocking movement of said levers and completes the reverse operation of said valve to effect a reverse operation of said motor.

14. A fluid system comprising in combination, a double acting reciprocatory pump, a motor for operating said pump, means including a rotary pump for actuating said motor, a valve disposed between said pumps for controlling the operation of said motor, operating mechanism for said valve including a pair of levers, a roller mounted at the free end of one of said levers, a snap mechanism adapted to engage said roller to rock said levers in either direction, means operated by said motor for engaging an arm of the other of said levers to actuate the same a predetermined distance and at the same time load said snap mechanism, the latter of which then completes the rocking movement of said levers and completes the reverse operation of said valve to effect a reverse operation of said first mentioned pump, and means including a third pump for controlling the pressure of the fluid in said rotary pump.

15. In an apparatus for subjecting materials to high pressures, the combination of a pump for supplying test fluid under pressure to the material under test, a motor for operating said pump, means including a second pump for actuating said motor, means including a third pump for controlling the pressures developed by said second pump, and adjustable control means associated with said third pump for varying the pressures developed thereby.

16. Apparatus for subjecting containers to high pressures comprising in combination, a pump for supplying fluid under pressure to the container under test, a motor for operating said pump, means including a second pump for operating said motor, means including a third pump for controlling the operation of said second pump, adjustable control means associated with said third pump for varying the pressure conditions of the test fluid, fluid pressure means operatively associated with said third pump for further varying said pressure conditions, and valve means for controlling the operation of said fluid pressure means.

17. Apparatus for subjecting containers to high pressures, comprising in combination a double acting reciprocatory pump for supplying test fluid under pressure to the container under test, a motor for operating said pump, means including a second pump for actuating said motor, a valve disposed between said motor and second pump for controlling the operation of said motor, means operated by said motor for shifting said valve to effect a reverse operation of said reciprocatory pump, means including a third pump for controlling the operation of said second pump, adjustable control means associated with said third pump, fluid pressure means associated with said third pump for controlling the operation thereof, and a valve for controlling the operation of said fluid pressure means.

18. Apparatus for subjecting containers to high pressures, comprising in combination, a reciprocatory pump for supplying test fluid under pressure to the container under test, a motor for operating said pump, means including a second pump for actuating said motor, a valve disposed between said motor and second pump for controlling the operation of said motor, means operated by said motor for moving said valve toward a central position, and snap mechanism for completing the movement of said valve to effect a reverse operation of said first mentioned pump, and means including a third pump for controlling the pressures in said second pump and thereby of the test fluid supplied to said container.

19. Apparatus for subjecting containers to high pressures, comprising in combination, a pump for supplying fluid under pressure to the container under test, a motor for operating said pump, means including a second pump for operating said motor, means including a third pump for controlling the operation of said second pump, adjustable resilient means for placing said third pump on stroke and maintaining a relatively high predetermined pressure upon the container under test, and means operatively connected to said third pump for effecting a reduction in the pressure of the fluid impressed upon said container by said first mentioned pump.

20. Apparatus for subjecting containers to high pressures, comprising in combination, a pump for supplying fluid under pressure to the container under test, a motor for operating said pump, means including a second pump for operating said motor, means including a third pump for controlling the operation of said second pump, adjustable resilient means operatively connected to said third pump for effecting a variation in the pressure of the test fluid impressed upon said containers, fluid pressure means connected to the pressure side of said third pump and operating in opposition to said resilient means whereby the pressure of said test fluid is maintained constant during a testing operation, and normally ineffective means adapted to operate in conjunction with said fluid pressure means to effect a reduction in the pressure of the fluid impressed upon said container, and means for rendering said normally ineffective means effective.

21. In a device of the class described, the combination with a pump, of a pressure pipe and a suction pipe leading from said pump, a valve operatively connected to said pressure pipe, fluid pressure means for adjusting said valve to different positions of adjustment to control the operation of said pump, said valve when adjusted to one position effects operation of said pump at a relatively high pressure, when adjusted to another position of adjustment said pump operates at a reduced pressure, and when adjusted to a third position of adjustment said pump operates at substantially no pressure, and means for controlling the operation of said fluid pressure means.

22. In a fluid system, the combination of variable stroke pump, fluid pressure means for placing said pump on discharge stroke, a second pump for supplying fluid pressure to said fluid pressure means, adjustable resilient means for placing said second pump on discharge stroke and predetermining the pressures developed therein, means connected to said second pump opposing the action of said resilient means, normally ineffective means adapted to supplement the action of said last mentioned means, and means for controlling the operation of said normally ineffective means.

23. In a fluid system, the combination of a variable stroke pump, fluid pressure means for placing said pump on discharge stroke, means operated by the pressure delivered by said pump tending to actuate the latter toward leakage stroke position in opposition to said fluid pressure means, a second pump, adjustable resilient means for placing said second pump on discharge stroke, means connecting said fluid pressure means to the pressure side of said second pump, a servomotor connected to the pressure side of said second pump tending to actuate the latter toward leakage stroke position, a second normally ineffective servomotor operatively connected to said second pump and adapted to operate in unison with said first mentioned servomotor, and means for rendering said second servomotor effective.

24. In a fluid system, the combination of a rotary variable stroke pump, a fluid motor for placing said pump on discharge stroke, a second pump for supplying fluid pressure to said fluid motor, a second fluid motor connected to said first mentioned pump adapted to operate in opposition to said first mentioned motor to actuate said pump towards leakage stroke position, adjustable resilient means for placing said second pump on discharge stroke, a fluid motor connected with the pressure side of said second pump tending to actuate the latter towards leakage stroke position against the pressure of said resilient means, a second normally ineffective fluid motor operatively connected to said second pump and adapted to operate in unison with the first mentioned fluid motor connected to said pump, and means for rendering said second servomotor effective.

25. In a fluid system, the combination of a rotary variable stroke pump, a fluid motor for placing said pump on discharge stroke, a second pump for supplying fluid pressure to said fluid motor, a second fluid motor connected to said first mentioned pump adapted to operate in opposition to said first mentioned motor, to actuate said pump towards leakage stroke position, adjustable resilient means for placing said second pump on discharge stroke, a fluid motor connected with the pressure side of said second pump tending to actuate the latter towards leakage stroke position against the pressure of said resilient means, a second normally ineffective fluid motor operatively connected to said second pump and adapted to operate in unison with the first mentioned fluid motor connected to said pump, and means for rendering said second servomotor effective, said last mentioned means comprising a valve operatively connected to the discharge side of said second pump.

26. In a fluid system, the combination of a rotary variable stroke pump, a fluid motor for placing said pump on discharge stroke, a second pump for supplying fluid pressure to said fluid motor, a second fluid motor connected to said first mentioned pump adapted to operate in opposition to said first mentioned motor, to actuate said pump towards leakage stroke position, adjustable resilient means for placing said second pump on discharge stroke, a fluid motor connected with the pressure side of said second pump tending to actuate the latter towards leakage stroke position against the pressure of said resilient means, a second normally ineffective fluid motor operatively connected to said second pump and adapted to operate in unison with the first mentioned fluid motor connected to said pump, and means for rendering said second servomotor effective, said last mentioned means comprising an adjustable valve, means for actuating said valve to different positions of adjustment, said valve when actuated to one position of adjustment traps the fluid discharging from said second pump, when moved to a second position of adjustment said valve permits the fluid discharging from said pump to flow to the second mentioned fluid motor of said second pump whereby said fluid motor operates in unison with the said first mentioned fluid motor associated with said pump, and when actuated to a third position of adjustment said valve connects the discharge of said second pump to exhaust whereby the fluid discharging from said pump bypasses to exhaust at substantially no pressure.

HENRY W. LANDENBERGER.